United States Patent [19]

Evans et al.

[11] 3,836,073
[45] Sept. 17, 1974

[54] HEATING, COOLING AND VENTILATING GRILLS

[75] Inventors: William Thomas Evans, Motherwell; Ian Fraser, Lanarkshire, both of Scotland

[73] Assignee: Ian Fraser, Forth, Lanarkshire, Scotland

[22] Filed: Dec. 4, 1972

[21] Appl. No.: 311,449

[30] Foreign Application Priority Data
Dec. 4, 1971 Great Britain.................... 56378/71
Mar. 8, 1972 Great Britain.................... 10683/72
Mar. 21, 1972 Great Britain.................... 13108/72
Mar. 25, 1972 Great Britain.................... 14113/72

[52] U.S. Cl.............................. 236/49, 98/40 VT
[51] Int. Cl........................ F24f 11/02, F24f 13/08
[58] Field of Search............ 98/1, 40 VT, 40 D, 89; 236/49, 1 B

[56] References Cited
UNITED STATES PATENTS
2,117,529  5/1938  Wile et al. ........................ 236/49 X
2,407,284  9/1946  Kennedy........................... 98/40 VT
3,068,776  12/1962  Day.................................. 98/40 VT
3,312,159  4/1967  Shepherd................................. 98/1

*Primary Examiner*—William E. Wayner
*Attorney, Agent, or Firm*—Young & Thompson

[57] ABSTRACT

The invention herein disclosed is concerned with a temperature controlled air ventilation outlet grill. The grill comprises a frame in which are mounted a plurality of pivoted louvres biased towards a closed position with a bimetal actuator sensing the room temperature moving the louvers towards their closed position upon appropriate room temperature changes.

4 Claims, 4 Drawing Figures

HEATING, COOLING AND VENTILATING GRILLS

This invention relates to heating, cooling and ventilating grills of the kind having pivotally mounted louvres which are adjustable between an open position and a closed position.

According to the present invention there is provided a grill for heating, cooling or ventilating system and comprising a frame, a plurality of interconnected louvres pivotally mounted on and extending across said frame, and a temperature sensitive actuator mounted on the frame and connected to said louvres so as to pivot same and adjust the effective flow area through the grill in accordance with a change in temperature.

Figure 1:
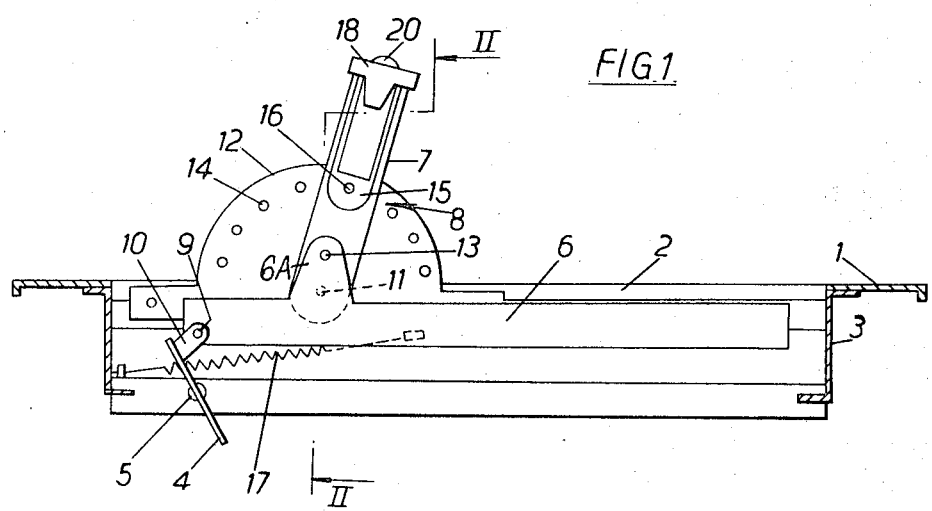
Figure 2:
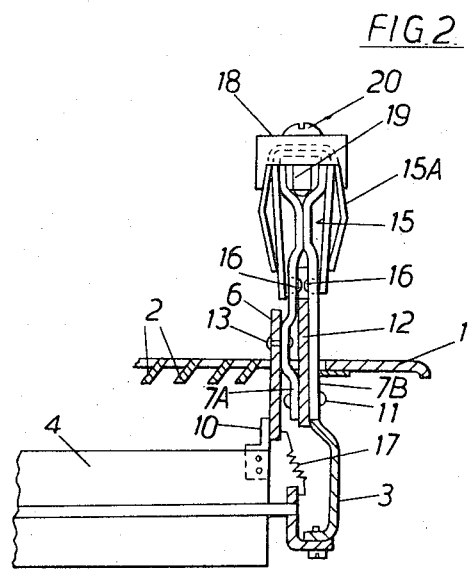

Embodiments of the invention will now be described, by way of example, with reference to the accompanying drawing, in which:

FIG. 1 is a sectional end view of one embodiment of a grill according to the present invention; and FIG. 2 is a fragmentary sectional view approximately on the line II—II of FIG. 1.

Referring to FIGS. 1 and 2, a ventilator grill consists generally of a rectangular outer frame 1 adapted to be secured to a wall and having fixed louvres 2, a rectangular inner frame 3 carrying louvres 4 which extend at right angles to the louvres 2 and are pivotable at 5 between a closed position and a fully open position, and control means for pivotally adjusting the louvres 4 and consisting generally of a bar 6, a control lever 7 and a catch 8.

The louvres 4 are pivotally attached to the bar 6 at 9 by lugs 10, the lever at its inner end is pivotted at 11 to a semi-circular segment 12 which is secured to the frame 3, and the bar 6 has a lug 6A pivotted at 13 to the lever 7 at a point spaced from the pivot 11. Thus, if the lever 7 is swung from one end of the segment 12 to the other, the bar 6 also swings and moves the louvres 4 between their closed and fully open positions. In FIG. 1, the louvres 4 pivot anti-clockwise to their closed position.

The lever 7 consists of two arms 7A, 7B straddling the segment 12 and having opposed holes which can be aligned with any one of an arcuate series of holes 14 in the segment 12. The lever 7 at its outer end carries a bi-metallic element 15 of generally inverted U-shape, and the free ends of the legs of the U have bosses 16 which are preferably part-spherical and project through the holes in the arms 7A, 7B into one of the holes 14 so as to hold the lever 7 in the position to which it is set. The free ends of the legs are urged towards the arms 7A, 7B by an inverted U-shaped leaf spring 15A overlying the element 15 on the lever 7.

The bar 6 is urged by a spring 17 to the position in which the louvres 4 are closed. Thus, at a predetermined temperature, the legs of the element 15 move apart causing the bosses 16 to disengage the hole 14, so that the louvres 4 are moved to their closed position by the spring 17.

The bi-metallic element 15 is preferably so selected and arranged as to affect closing of the louvres 4 in the case of an outbreak of fire.

The holes 14 may be replaced by indents, and instead of the bosses 16, there may be a spring-loaded pawl or pawls engaging an indent, and movable out of said engagement by a bi-metallic element.

Also, the arrangement may alternatively be such that the segment 12 is formed as or incorporates a bi-metallic element, and the lever is rigid.

In FIGS. 1 and 2, the numeral 18 indicates a cap for the lever 7, and, the numerals 19 and 20 indicate a nut and bolt for holding together the cap 18, the handle 7; the element 15 and the spring 15A.

Side lugs on the cap 18 can be bent inwards or outwards so as to vary the pressure of the spring 15A.

We claim:

1. A grill for heating, cooling or ventilating system and comprising a frame having an air inlet side and an air outlet side, a plurality of interconnected louvres pivotally mounted on and extending across said frame, a temperature sensitive actuator mounted on the frame and connected to said louvres so as to pivot same and adjust the effective flow area through the grill in accordance with a change in temperature, said actuator projecting from the air outlet side of the frame in a direction away from the air inlet side of the frame, whereby, in use, the actuator projects into the space being heated, cooled or ventilated and is sensitive to the ambient temperature of said space, means biassing the pivotally adjustable louvres towards their closed position, and a control member held in the open position of the grill by a catch which includes a bi-metallic element adapted to release the catch at a predetermined temperature, so that the louvres are urged to their closed position by said biassing means.

2. A grill as claimed in claim 2, in which the control member is a lever having two opposed arms straddling and pivotally connected at one end to a segment secured to the frame, the arms have opposed holes which are aligned with any one of an arcuate series of holes in the segment, the lever at its other end carries a bi-metallic element generally of U-shape, and the free ends of the legs of the U have bosses which project through the holes in said arms into the aligned hole in the segment.

3. A grill as claimed in claim 3, in which the free ends of the legs of the bi-metallic element are urged towards the arms by a generally U-shaped leaf spring overlying the bi-metallic element.

4. A grill as claimed in claim 2, in which the louvres are interconnected by a bar which is biassed by a spring to the position in which the louvres are closed.

* * * * *